United States Patent
Horng et al.

(10) Patent No.: US 11,614,371 B2
(45) Date of Patent: Mar. 28, 2023

(54) THERMAL SENSOR CIRCUIT AND CALIBRATION METHOD USING THE SAME

(71) Applicant: Taiwan Semiconductor Manufacturing Co., Ltd., Hsinchu (TW)

(72) Inventors: Jaw-Juinn Horng, Hsinchu (TW); Szu-Lin Liu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 273 days.

(21) Appl. No.: 16/867,494

(22) Filed: May 5, 2020

(65) Prior Publication Data

US 2021/0063254 A1 Mar. 4, 2021

Related U.S. Application Data

(60) Provisional application No. 62/893,171, filed on Aug. 28, 2019.

(51) Int. Cl.
*G01K 15/00* (2006.01)

(52) U.S. Cl.
CPC ............................... *G01K 15/005* (2013.01)

(58) Field of Classification Search
None
See application file for complete search history.

(56) References Cited

U.S. PATENT DOCUMENTS

2007/0205916 A1* 9/2007 Blom ................... G01K 7/01
374/E7.035

\* cited by examiner

*Primary Examiner* — Erica S Lin
(74) *Attorney, Agent, or Firm* — JCIPRNET (57) ABSTRACT

A thermal sensor circuit that includes a temperature sensing circuit, an analog to digital converter, a processor, a divider circuit and a digital circuit is introduced. The temperature sensing circuit generates first and second temperature-dependent voltages. The digital to analog converter converts the first and second temperature-dependent voltages to first and second bit streams. The processor generates a third bit stream based on a thermal coefficient. The divider circuit divides one of the first and second bit streams by a denominator value to generate a fourth bit stream, wherein the denominator value is determined according to a bit value of the third bit stream. The digital circuit subtracts the other one of the first and second bit streams from the fourth bit stream to generate an output bit stream. The processor tunes the thermal coefficient until the output bit stream is equivalent to a bit stream of a reference model.

10 Claims, 6 Drawing Sheets

THERMAL SENSOR CIRCUIT AND CALIBRATION METHOD USING THE SAME

CROSS-REFERENCE TO RELATED APPLICATION

This application claims the priority benefit of U.S. provisional applications Ser. No. 62/893,171, filed on Aug. 28, 2019. The entirety of the above-mentioned patent application is hereby incorporated by reference herein and made a part of this specification.

BACKGROUND

A thermal sensor is used to sense a temperature in a wide range of applications. Traditionally, the thermal sensor needs one-point calibration or two-point calibration to maintain accuracy of the thermal sensor. However, the one-point and two-point calibrations increase testing cost and require a large device ratio options in the design phase.

Currently, the thermal sensor usually uses a bipolar junction transistor (BJT) ratio to coarsely or finely adjust the slope of a differential voltage (dVBE) curve formed by the differential voltage (dVBE) versus temperature. The thermal sensor may also use a current mirror and a resistor ratio to adjust the slope of the dVBE curve. However, a large slope adjustment resolution of the dVBE may reduce the performance and accuracy of a calibration process for the thermal sensor.

As demand for a thermal sensor circuit with a fractional tuning resolution has grown recently, there has grown a need for more creative method and designs for a thermal sensor.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference s and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1:
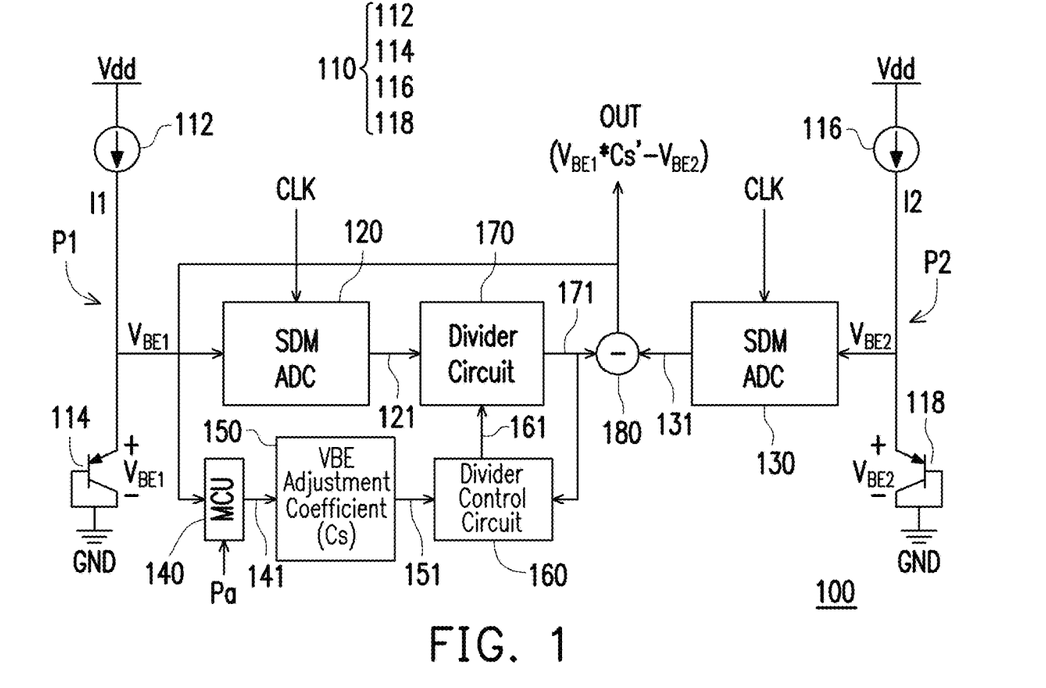
FIG. 1 is a schematic diagram illustrating a thermal sensor circuit in accordance with some embodiments.

FIG. 1 shows a thermal sensor circuit 100 in accordance with some embodiments. The thermal sensor circuit 100 may include a temperature sensing circuit 110, analog-to-digital converters (ADCs) 120 and 130, a processor 140 for controlling a VBE adjustment coefficient block 150, a divider control circuit 160, a divider circuit 170 and a logic circuit 180. In some embodiments, the temperature sensing circuit 110 includes current mirrors 112 and 114 and bipolar junction transistors (BJTs) 116 and 118, in which the current mirror 112 and the BJT 114 form a BJT path P1, and the current mirror 116 and the BJT 118 form a BJT path P2. It is noted that that the BJTs 116 and 118 may be replaced by any other suitable type of transistors.

In the BJT path P1, the current mirror 112 is electrically coupled to the BJT 114 and is configured to provide a bias current I1 to the BJT path P1. In some embodiments, the bias current I1 is a constant current that is generated based on a reference voltage Vdd. The BJT 114 has a base terminal, an emitter terminal and a collector terminal, where the emitter terminal of the BJT 114 is coupled to the current mirror 112, the collector terminal of the BJT 114 is grounded, and the base terminal of the BJT 114 is coupled to the collector terminal of the BJT 114 to form a diode. When the bias current I1 passes through the base-emitter junction of the BJT 114, a voltage VBE1 which is a voltage between the base terminal and the emitter terminal of the BJT 114 is generated. The voltage VBE1 is a temperature-dependent voltage, where the value of the voltage VBE1 varies according to a function of the temperature.

In the BJT path P2, the current mirror 116 is electrically coupled to the BJT 118 and is configured to provide a bias current I2 to the BJT path P2. In some embodiments, the bias current I2 is a constant current that is generated based on a reference voltage Vdd. The bias current I1 could be same as or different from the bias current I2. The emitter terminal of the BJT 118 is coupled to the current mirror 116, the collector terminal of the BJT 118 is grounded, and the base terminal of the BJT 118 is coupled to the collector terminal of the BJT 118 to form a diode. When the bias current I2 passes through the base-emitter junction of the BJT 118, a voltage VBE2 which is a voltage between the base terminal and the emitter terminal of the BJT 118 is generated. The voltage VBE2 is a temperature-dependent voltage, where the value of the voltage VBE2 varies according to a function of the temperature.

In some embodiments, the BJT paths P1 and P2 have different current densities, in which the current density of each of the BJT paths P1 and P2 may depend on values of the bias current and a size of the BJT. For example, to set different current densities for the BJT paths P1 and P2, different bias currents I1 and I2 are provided to the same size BJTs 114 and 118, or the same bias current I1 and I2 are provided to the different sizes BJTs 114 and 118, or different bias currents I1 and I2 are provided to the different sizes BJTs 114 and 118. In some embodiments, the sizes of the BJTs 114 and 118 includes widths of the BJTs 114 and 118, respectively. In some embodiments, the lengths of the BJTs 114 and 118 are identical, and the sizes of the BJTs 114 and 118 are determined according to the widths of the BJTs 114 and 118. In some alternative embodiments, the size the BJT 114 is determined according to a ratio of the width and length of the BJT 114; and the size of the BJT 118 is determined according to a ratio of the width and length of the BJT 118.

In some embodiments, each of the current mirrors 112 and 116 includes a current setting resistor, an input part and an output part, in which the input part includes an input transistor and the output part include an output transistor. The control terminals of the input transistor and the output transistor are coupled to each other, and the input transistor functions as a diode. The current mirror 112 may generate the bias current I1 based on a first resistance value of the current setting resistor included in the current mirror 112; and the current mirror 116 may generate the bias current I2 based on a second resistance value of the current setting resistor included in the current mirror 116. In some embodiments, the first resistance value is different from the second resistance value. As such, the bias current I1 that is generated by the current mirror 112 is different from the bias current I2 that is generated from the current mirror 116.

The BJT path P1 outputs the voltage VBE1 through a connection node between the current mirror 112 and the BJT 114; and the BJT path P2 outputs the voltage VBE2 through a connection node between the current mirror 116 and the BJT 118.

In some embodiments, the ADCs 120 and 130 are coupled to the BJT paths P1 and P2 to receive the voltages VBE1 and VBE2, respectively. Each of the ADCs 120 and 130 are further configured to receive a clock signal CLK from a clock generator (not shown). The ADC 120 is configured to convert the voltage VBE1 to a bit stream 121 based on the clock signal CLK, in which an average power of the voltage VBE1 is equivalent to an average power of the bit stream 121. The ADC 130 is configured to convert the voltage VBE2 to a digital bit stream 131 based on the clock signal CLK, in which an average power of the voltage VBE2 is equivalent to an average power of the bit stream 131. In some embodiments, the ADCs 120 and 130 are second order or higher order sigma-delta modulator (SDM) ADCs having 1-bit or multi-bit resolution. In addition, a timing algorithm used for the ADCs 120 and 130 could be based on discrete or continuous timing.

In some embodiments, the processor 140 is configured to perform a fractional slope adjustment on a differential voltage (e dVBE) by adjusting a thermal coefficient Cs which is one of parameters in formula calculating the differential voltage dVBE. The processor 140 may outputs a control bit stream 141 to control the VBE adjustment coefficient block 150 to generate bit stream 151 based on the thermal coefficient Cs. In some embodiments, the average one duty cycle of the bit stream 151 is equivalent to the thermal coefficient Cs. For example, if the value of the thermal coefficient Cs is 0.9, then the bit stream 151 may include nine cycles of "1" bit value and one cycle of "0" logic value per ten cycle bit.

In some embodiments, the divider control circuit 160 is coupled to the VBE adjustment coefficient block 150 to receive the bit stream 151, and is configured to determine a denominator value for the divider circuit 170 according to bit values of the bit stream 151. For example, when the bit value of the bit stream 151 has a logic value of "1", the denominator value is set to a first value (e.g., N). When the bit value of the bit stream 251 has a logic value of "0", the denominator value is a second value (e.g., N+1). The value of N may be determined according to a BJT ratio which is a ratio of BJT sizes of the BJTs 114 and 118 in the BJT paths P1 and P2 of the thermal sensor circuit 100. The divider control circuit 160 may output a determination result 161 that indicates the value of the denominator value to the divider circuit 170

In some embodiments, divider circuit 170 is coupled to the ADC 120 and the divider control circuit 160 to receive the bit stream 121 from the ADC 120 and the determination result 161 from the divider control circuit 160. The divider circuit 170 is configured to divide the bit stream 121 by the denominator value determined by the divider control circuit 160 to generate the bit stream 171. In other words, the divider circuit 170 may divide the bit stream 121 by N or N+1 based on the bit value of the bit stream 151 to generate the bit stream 171. In some embodiments, the bit stream 171 is determined according to the equation (1), in which C is the bit stream 171, A is the bit stream 121, Cs is the thermal coefficient, and N is the BJT ratio.

$$C = A/(N+1-Cs) \tag{1}$$

In other words, the bit stream 171 is determined by multiplying the bit stream 121 with an adjustment thermal coefficient Cs', where the adjustment thermal coefficient Cs' is equal to $1/(N+1-Cs)$. Since the bit stream 121 is equivalent to the voltage VBE1, the bit stream 171 is equivalent to the multiplication of the voltage VBE1 and the adjustment thermal coefficient Cs' (e.g., VBE1*Cs'). In an example when the value of N is equal to 1, the adjustment thermal coefficient Cs is $1/(2-Cs)$. If the value of Cs is 0.9, the value of the Cs' is 0.990099.

In some embodiments, the logic circuit 180 is coupled to the divider circuit 170 and the ADC 130 to receive the bit stream 171 from the divider circuit 170 and the bit stream 131 from the ADC 130. The logic circuit 180 is configured to perform an operation to subtract the bit stream 131 from the bit stream 171 to generate an output bit stream OUT. Since the bit stream 131 is equivalent to the voltage VBE2 and the bit stream 171 is equivalent to the value of VBE1*Cs', the output bit stream OUT is equivalent to the value of dBEV that is calculated according to equation (2).

$$dVBE = VBE1*Cs' - VBE2 \quad (2)$$

In other words, the processor 140 may output the control bit stream 141 the blocks and circuits (e.g., the VBE adjustment coefficient block 150, the divider control circuit 160 and the divider circuit 170) that are related to the generation and adjustment of the thermal coefficient Cs, thereby adjusting the thermal coefficient Cs. As the thermal coefficient Cs is adjusted, the slope of the differential voltage dVBE is adjusted accordingly based on the equation (2). In addition, as the slope of the differential voltage dVBE may be adjusted in a tiny resolution, the fraction slope adjustment to on the differential voltage dVBE is achieved.

Mathematically, the bias current I1 and I2 that are generated by the current mirrors 112 and 116 are calculated based on equations (3) and (4), in which Is is a saturation current, η is a process dependent parameter, k is the Boltzmann's constant, and T is a Celsius temperature value. In equations (3) and (4), it assumes that the BJT ratio of the sizes of the BJTs 118 and 114 is N. To multiply the thermal coefficient Cs with the voltage VBE1, the formula in equation (5) is performed. In some embodiments, the differential voltage dVBE is calculated based on the formulas shown in equations (6) and (7).

$$I1 = I_s \exp\frac{V_{BE1}}{\eta k(273+T° C.)} \quad (3)$$

$$I2 = NI_s \exp\frac{V_{BE2}}{\eta k(273+T° C.)} \quad (4)$$

$$(I1)^{C_s} = I_s \exp\frac{V_{BE1} \times C_s}{\eta k(273+T° C.)} \quad (5)$$

$$\frac{(I1)^{C_s}}{I2} = \frac{I_s \exp\frac{V_{BE1} \times C_s}{\eta k(273+T° C.)}}{NI_s \exp\frac{V_{BE2}}{\eta k(273+T° C.)}} \quad (6)$$

$$dV_{BE} = V_{BE1} \times C_s - V_{BE2} = \ln(I1^{1-C_s}N)(\eta k)(273+T° C.) \quad (7)$$

As shown in equation (7), the slope adjustment resolution is $\ln(I1^{1-C_s}N)(\eta k)$, in which $I1^{1-C_s}N$ is a fractional coefficient. By adjusting the value of the thermal coefficient Cs, the thermal sensor circuit 100 may perform the fractional slope adjustment on the differential voltage dVBE.

In some embodiments, the bit stream 171 outputted by the divider circuit 170 is provided back to the divider control circuit 160 as a feedback signal. The feedback signal may serve as a clock source for the divider control circuit 160. In some embodiments, the output bit stream OUT is provided back to the processor 140, such that the processor 140 may effectively tune the thermal coefficient Cs. In some embodiments, the processor 140 may further receive a user-defined parameter Pa, and is configured to perform the fractional slope adjustment process according to the user-defined parameters Pa and the differential voltage dVBE that is fed back from the logic circuit 180. In some embodiments, the processor 140 is configured to adjust the thermal coefficient Cs until the slope of the differential voltage dVBE is equal to a reference slope of a reference differential voltage value of a reference model.

In some embodiment, the reference slope of the reference differential voltage is the slope value measured from a reference semiconductor die in a reference temperature. The reference slope is provided to the processor 140. The processor 140 may output control bits to tune the thermal coefficient Cs to adjust the slope of the differential voltage dVBE until the slope of the differential voltage dVBE is equal to the reference slope. The processor 140 may map the control bits to other semiconductor dies without performing any additional calibration. In other words, the thermal sensor circuit may be calibrated the without requirement for a calibration point. In this way, the thermal sensor circuit may be considered as zero-point calibration thermal sensor circuit.

Figure 2:
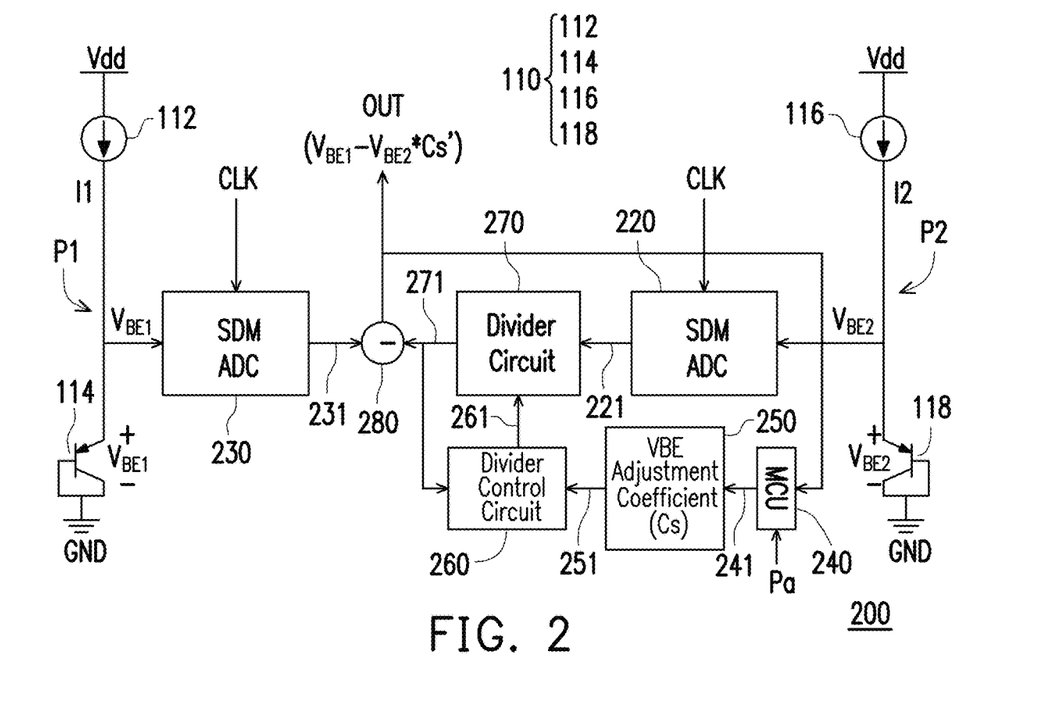
FIG. 2 is a schematic diagram illustrating a thermal sensor circuit in accordance with some alternative embodiments.

FIG. 2 illustrates a thermal sensor circuit 200 in accordance with some alternative embodiments. Same elements in FIG. 2 have a same reference numbers as the thermal sensor circuit 100 shown in FIG. 1. In comparison with the thermal sensor circuit 100, the thermal sensor circuit 200 performs the fractional slope adjustment based on the voltage VBE2 of the BJT path P2 instead of the voltage VBE1 of the BJT path P1.

The thermal sensor circuit 200 may include the temperature sensing circuit 110, ADCs 220 and 230, a processor 240 for controlling a VBE adjustment coefficient block 250, a divider control circuit 260, a divider circuit 270 and a logic circuit 280. The structures and functions of the temperature sensing circuit 110 and the ADCs 220 and 230 shown in FIG. 2 are similar to the structures and functions of the temperature sensing circuit 110 and the ADCs 120 and 130 shown in FIG. 1, thus the detailed description is omitted hereafter.

Referring to FIG. 2, the processor 240 may output a control bit stream 241 to the VBE adjustment coefficient block 250 to generate bit stream 251 based on the thermal coefficient Cs. The average one duty cycle of the bit stream 251 may be equivalent to the thermal coefficient Cs. For example, if the value of the thermal coefficient Cs is 0.9, then the bit stream 151 may include nine cycles of "1" bit value and one cycle of "0" logic value per ten cycle bit. In some embodiments, the divider control circuit 260 is configured to determine a denominator value for the divider circuit 270 according to bit values of the bit stream 251; and the divider circuit 270 is configured to performed a division operation to divide the bit stream 241 by the denominator value. For example, when the bit value of the bit stream 251 has a logic value of "1", the denominator value is a first value (e.g., N); and when the bit value of the bit stream 251 has a logic value of "0", the denominator value is a second value (e.g., N+1). In some embodiments, the bit stream 271 is equivalent to the multiplication of the voltage VBE2 with and adjustment thermal coefficient Cs' (VBE2*Cs'), in which the value of the adjustment thermal coefficient Cs' is equal to 1/(N+1−Cs).

In some embodiments, the logic circuit 280 is configured to perform an operation to subtract the bit stream 271 from the bit stream 231 to generate an output bit stream OUT. Since the bit stream 231 is equivalent to the voltage VBE1, and the bit stream 471 is equivalent to a multiplication of the voltage VBE2 and the adjustment thermal coefficient Cs' (VBE2*Cs'), the output bit stream OUT corresponds to the value of dVBE that is determined according to equation (8).

$$dVBE = VBE1 - VBE2*Cs' \quad (8)$$

Figure 3A:
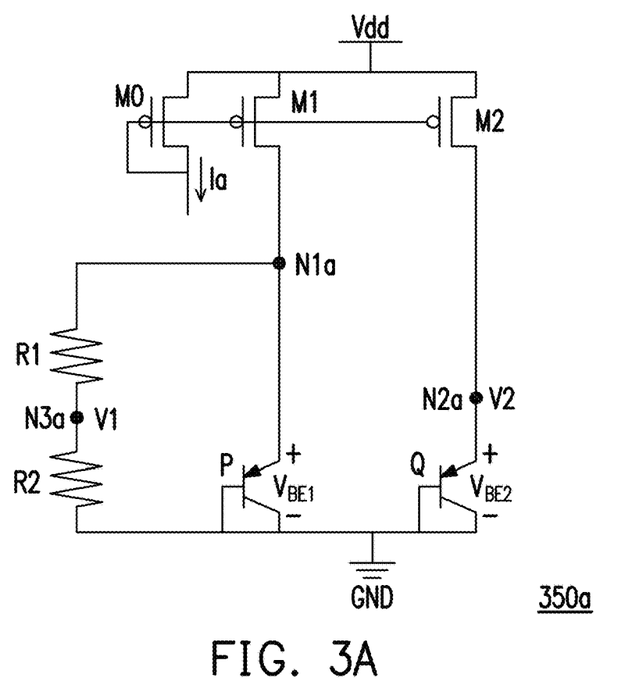
FIGS. 3A through 3B are schematic diagrams illustrating circuits for a fractional slope adjustment for a single-brand in accordance with some embodiments.

In some embodiments, the bit stream 271 if provided back to the divider control circuit 260 to server a as clock source for the divider control circuit 260. In addition, the output bit stream OUT may be provided back to the processor 240, such that the processor 240 may tune the thermal coefficient Cs. In some embodiments, the processor 240 further receives a user-defined parameter Pa, and is configured to tune the thermal coefficient Cs based on the user-defined parameter Pa and the output stream OUT that is fed back from the logic circuit 280. In some embodiments, the processor 240 is configured to adjust the thermal coefficient Cs until the slope of the differential voltage dVBE (VBE1−VBE2*Cs') is equal to a reference slope of a reference differential voltage of a reference model FIG. 3A shows a circuit 350 a for reducing a slope of differential voltage dVBE in a fractional slope adjustment process in accordance with some embodiments. The slope reduction of the differential voltage dVBE is performed by adjusting the thermal coefficient Cs which is multiplied with the voltage VBE1 in the formula for calculating the differential voltage dVBE.

In some embodiments, the circuit 350 a includes BJTs P and Q and current mirrors formed by the transistors M0, M1 and M2. The transistor M1 is coupled to the BJT P through a connection node N1a, and the transistor M2 is coupled to the BJT Q through a connection node N2a. The base terminals of the BJTs P and Q are coupled to the collector terminals of the BJTs P and Q, respectively to form diodes. The circuit 350 a may further include resistors R1 and R2 being coupled in series through a connection node N3a.

The current mirrors that are formed by the transistors M0, M1 and M2 are configured to provide a bias current Ia to the BJTs P and Q to generate the voltages VBE1 and VBE2, respectively. The voltage V2 at the connection node N2 a is equal to the voltage VBE2 and the voltage V1 at the connection node N3a is equal to a value of VBE1*Cs, where the thermal coefficient Cs may be determined according to the resistance values of the resistors R1 and R2. In some embodiments, the thermal coefficient Cs is equal to R1/(R1+R2). The differential voltage dVBE of the voltages V1 and V2 is equal to value of VBE1*Cs−VBE2. By adjusting the thermal coefficient Cs, the slope reduction of the differential voltage dVBE is performed.

Figure 3B:
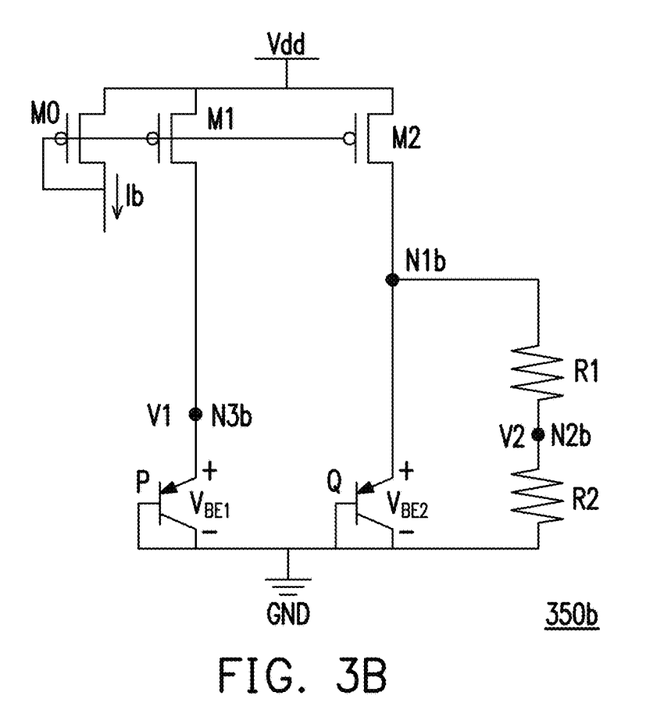

FIG. 3B shows a circuit 350b for increasing a slope of a differential voltage dVBE in a fractional slope adjustment process in accordance with some embodiments. The slope incremental of the differential voltage dVBE is performed by adjusting the thermal coefficient Cs which is multiplied with the voltage VBE2 in the formula for calculating the differential voltage dVBE. In comparison with the circuit 350 a shown in FIG. 3A, the thermal coefficient Cs is used for adjusting the voltage VBE2 instead of adjusting the voltage VBE1.

In some embodiments, the circuit 350b includes BJTs P and Q and current mirrors formed by the transistors M0, M1 and M2. The transistor M1 is coupled to the BJT P through a connection node N3b, and the transistor M2 is coupled to the BJT Q through a connection node N1b. The base terminals of the BJTs P and Q are coupled to the collector terminals of the BJTs P and Q, respectively to form diodes. The circuit 350 b further includes resistors R1 and R2 being coupled in series through a connection node N2b.

The current mirrors that are formed by the transistors M0, M1 and M2 are configured to provide the bias current Ib to the BJT P and Q, thereby generating the voltage VBE1 and VBE2. At the connection node N3b between the transistor M1 and the BJT P, the voltage V1 is equal to voltage VBE1. At the connection node N2b between the resistor R1 and the resistor R2, the voltage V2 is equal to a value of VBE2*Cs, where the thermal coefficient Cs may be determined according to the resistance values of the resistors R1 and R2. In some embodiments, the thermal coefficient Cs is equal to R1/(R1+R2). The differential voltage dVBE of the voltages V1 and V2 is equal to value of VBE1−VBE2*Cs. By adjusting the thermal coefficient Cs, the slope incremental of the differential voltage dVBE is performed.

Figure 4:
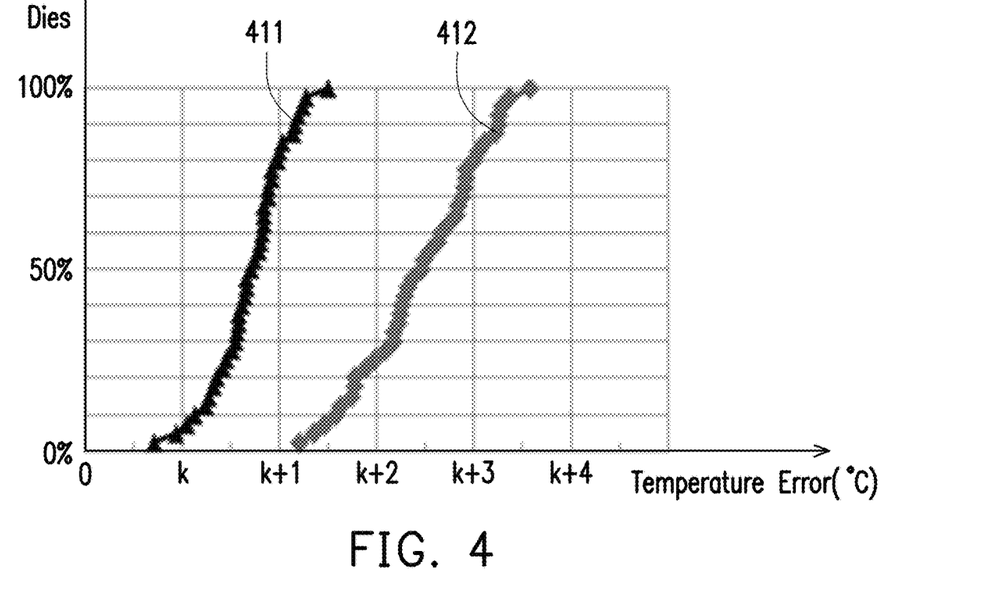
FIG. 4 is a diagram illustrating temperature errors of a thermal sensor without and with a factional slope adjustment in accordance with some embodiments.

FIG. 4 is a diagram illustrating temperature errors of a thermal sensor without and with the fractional slope adjustment in accordance with some embodiments. The horizontal axis of the diagram shown in FIG. 4 illustrates the temperature error and the vertical axis of the diagram shown in FIG. 4 illustrates semiconductor dies to be tested in percentages. FIG. 4 shows curves 411 and 412, in which the curve 411 indicates the temperature error of semiconductor dies where the fractional sloped adjustment is used; and the curve 412 indicates the temperature error of semiconductor dies where the fractional slope adjustment is not used. As shown in FIG. 4, the temperature errors with the fractional slope adjustment are smaller than the temperature errors without the fractional slope adjustment. In other words, the performance of the thermal sensor with the fractional slope adjustment is better than the thermal sensor without the fractional slope adjustment.

Figure 5:
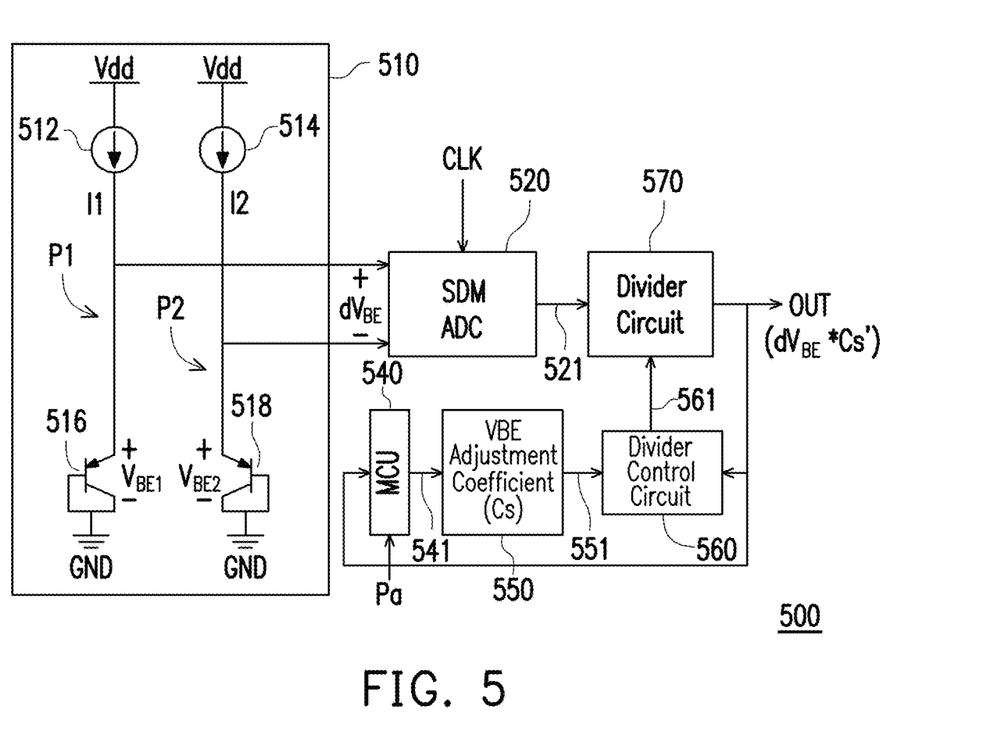
FIG. 5 is a schematic diagram illustrating a thermal sensor circuit in accordance with some alternative embodiments.

FIG. 5 illustrates a thermal sensor 500 in accordance with some alternative embodiments. The thermal sensor 500 may include a temperature sensing circuit 510, an ADC 520, a processor 540 for controlling a VBE adjustment coefficient block 550, a divider control circuit 560 and a divider circuit 570. The temperature sensing circuit 510 may include BJT paths P1 and P2, in which the BJT path P1 is formed by a current mirror 512 and a BJT 516, and the BJT path P2 is formed by a current mirror 514 and a BJT 518. The current mirrors 512 and 514 are configured to provide bias currents I1 and I2 to the BJTs 516 and 518. The BJTs 516 and 518 generate voltages VBE1 and VBE2 when the bias current I1 and I2 pass through the BJTs 516 and 518. The voltages VBE1 and VBE2 are temperature-dependent voltages, where the values of the voltages VBE1 and VBE2 vary according to a function of temperature. In some embodiments, a current density of the BJT path P1 is different from a current density of the BJT path P2.

The temperature sensing circuit 510 is configured to provide a differential voltage dVBE which is a voltage difference between the voltage VBE1 and the voltage VBE2 to the ADC 520. The ADC 520 is configured convert the differential voltage dVBE to a bit stream 521, in which an average power of the differential voltage dVBE may be equal to an average power of the bit stream 512.

The processor 540 is configured to output control bits 541 to the VBE adjustment coefficient block 550 to generate a bit stream 551 based on a thermal coefficient Cs. The ADC 520 may be a second order or a higher order SDM ADCs having 1-bit or multi-bit resolution. In addition, a timing algorithm used for the ADCs 520 could be based on discrete or continuous timing. In some embodiments, the average one duty cycle of the bit stream 551 is equal to the thermal coefficient Cs. For example, if the value of the thermal coefficient Cs is 0.9, then the bit stream 151 may include nine cycles of "1" bit value and one cycle of "0" logic value per ten cycle bit.

The divider control circuit 560 is configured to determine a denominator value for the divider circuit 570 according to bit values of the bit stream 551. For example, when the bit value of the bit stream 151 has a logic value of "1", the denominator value is set to a first value (e.g., N); and when the bit value of the bit stream 551 has a logic value of "0", the denominator value is a second value (e.g., N+1). The divider control circuit 560 may output a determination result 561 that indicates the value of the denominator value to the divider circuit 570.

The divider circuit 570 is configured to divide the bit stream 521 by the denominator value determined by the divider control circuit 560 to generate the output bit stream OUT. In some embodiments, the output bit stream OUT is equivalent to A/(N+1−Cs), in which N is the BJT ratio, A is the bit stream 521 and Cs is the thermal coefficient. In other words, the output bit stream OUT is determined by multiplying the bit stream 521 with an adjustment thermal coefficient Cs', where the adjustment thermal coefficient Cs' is equal to 1/(N+1−Cs). Since the bit stream 521 is equivalent to the differential voltage dVBE, the output bit stream OUT is equivalent to the multiplication of the differential voltage dVBE and the adjustment thermal coefficient Cs' (e.g., dVBE*Cs').

In some embodiments, the output bit stream OUT is provided back to the divider control circuit 560 and the processor 540 as a feedback signal. The feedback signal may serve as a clock source for the divider control circuit 560 and may be used by the processor 540 to tune the thermal coefficient Cs. In some embodiments, the processor 540 may further receive a user-defined parameters Pa, and is configured to tune the thermal coefficient Cs according to the user-defined parameter Pa and the feedback signal. The processor 540 may tune the thermal coefficient Cs until the slope of (dVBE1*Cs) is same as a reference slope of a reference model.

Figure 6:
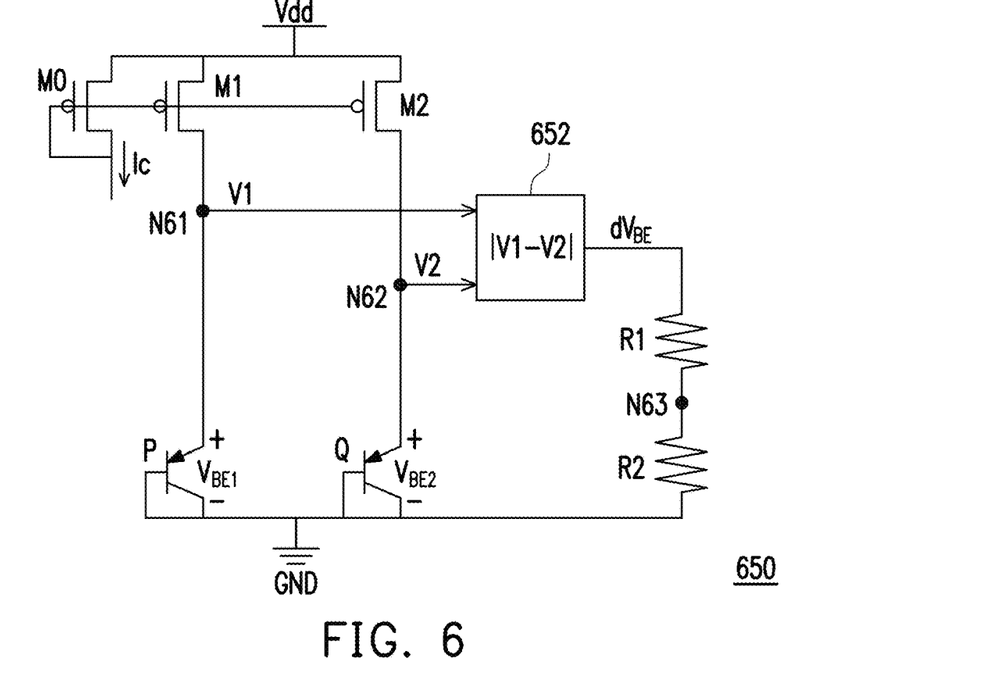
FIG. 6 is a schematic diagram illustrating a circuit for fractional slope adjustment for a differential voltage in accordance with some embodiments.

FIG. 6 illustrates a circuit 650 for adjusting a slope of a differential voltage dVBE in a fractional slope adjustment process in accordance with some embodiments. The circuit 650 may include BJTs P and Q and current mirrors formed by the transistors M0, M1 and M2. The transistor M1 is coupled to the BJT P through a connection node N61, and the transistor M2 is coupled to the BJT Q through a connection node N62. The base terminals of the BJTs P and Q are coupled to the collector terminals of the BJTs P and Q, respectively to form diodes. The current mirrors that are formed by the transistors M0, M1 and M2 are configured to provide a bias current Ic to the BJTs P and Q to generate the voltage VBE1 and VBE2, respectively. The voltage V1 at the connection node N61 is equal to the voltage VBE1 and the voltage V2 at the connection node N62 is equal to the voltage VBE2.

In some embodiments, the circuit 650 may further include a differential voltage circuit 652 and resistors R1 and R2, where the resistors R1 and R2 are coupled in series through a connection node N63 and the differential voltage circuit 652 is coupled between the connection nodes N61, N62 and the resistors R1, R2. The differential voltage circuit 652 is configured to calculate a voltage difference between the voltages V1 and V2 to generate the differential voltage dVBE. The circuit 650 adjusts the slope of the differential voltage dVBE by adjusting the thermal coefficient Cs that is multiplied with the differential voltage dVBE. In some embodiments, the thermal coefficient Cs is equal to R1/(R1+R2).

Figure 7:
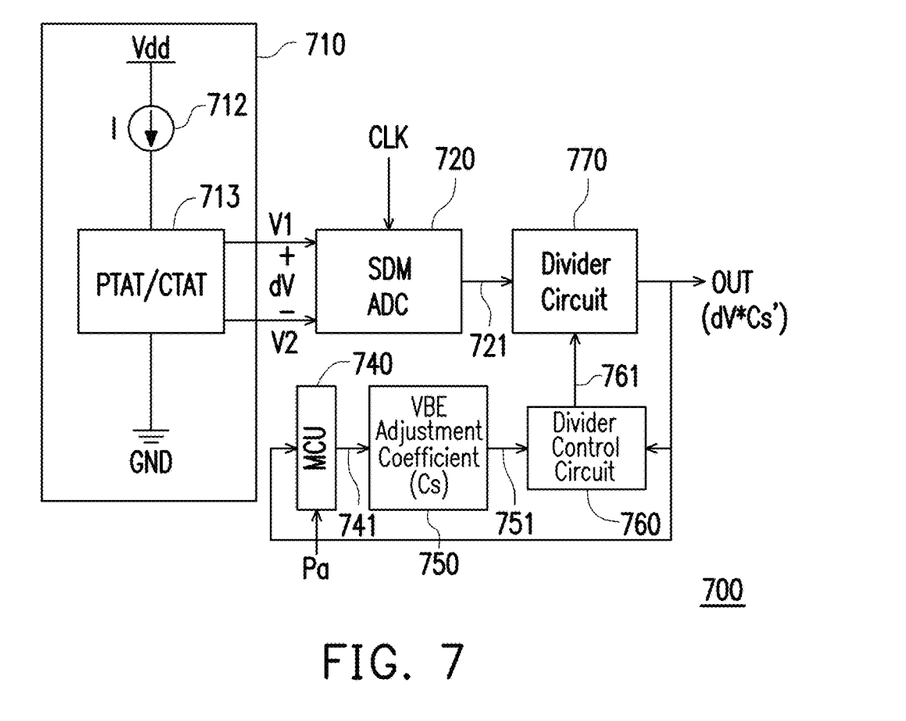
FIG. 7 is a schematic diagram illustrating a thermal sensor circuit that include a proportional to absolute temperature (PTAT) or a complementary to absolute temperature (CTAT) sensing device in accordance with some alternative embodiments.

FIG. 7 illustrates a thermal sensor circuit 700 in accordance with some embodiments of the disclosure. The thermal sensor circuit 700 may include a temperature sensing circuit 710, an ADC 720, a processor 740 for controlling a VBE adjustment coefficient block 750, a divider control circuit 760 and a divider circuit 770. The structures of the ADC 720, the processor 740, the divider control circuit 760 and the divider circuit 770 of the thermal sensor 700 shown in FIG. 7 are similar to the structures of the ADC 520, the processor 540, the divider control circuit 560 and the divider circuit 570 of the thermal sensor 500 shown in FIG. 5, thus the detailed description about these components are omitted hereafter.

One of the differences between the thermal sensor 700 shown in FIG. 7 and the thermal sensor 500 shown in FIG. 5 is that the temperature sensing circuit 710 of the thermal sensor 700 includes a current mirror 712 and a PTAT/CTAT temperature sensing circuit 713. The current mirror 712 is configured to provide a bias current I to the PTAT/CTAT temperature sensing circuit 713. The PTAT/CTAT temperature sensing circuit 713 may generate a differential voltage dV which is a temperature-dependent voltage according to the bias current I.

The ADC 720 may convert the differential voltage dV to digital bit stream 721. The processor 740 outputs control bits to the VBE adjustment thermal coefficient Cs to generate a bit stream 751 based on a thermal coefficient Cs. The divider control circuit 751 determines the denominator value for the divider circuit 770 according to the bit value of the bit stream 751, and outputs the determination result 761 to the divider circuit 770. The divider circuit 770 is configured to divide the bit stream 721 by the denominator value determined by the divider control circuit 760 to output an output bit stream OUT.

In some embodiments, the bit stream 721 is equivalent to the differential voltage dV and the output bit stream OUT is equivalent to a multiplication of the differential voltage dV and adjustment thermal coefficient Cs' (e.g., dV*Cs'). In some embodiments, the adjustment thermal coefficient Cs' is equal to 1/(N+1−Cs), wherein N is the BJT coefficient.

Figure 8A:
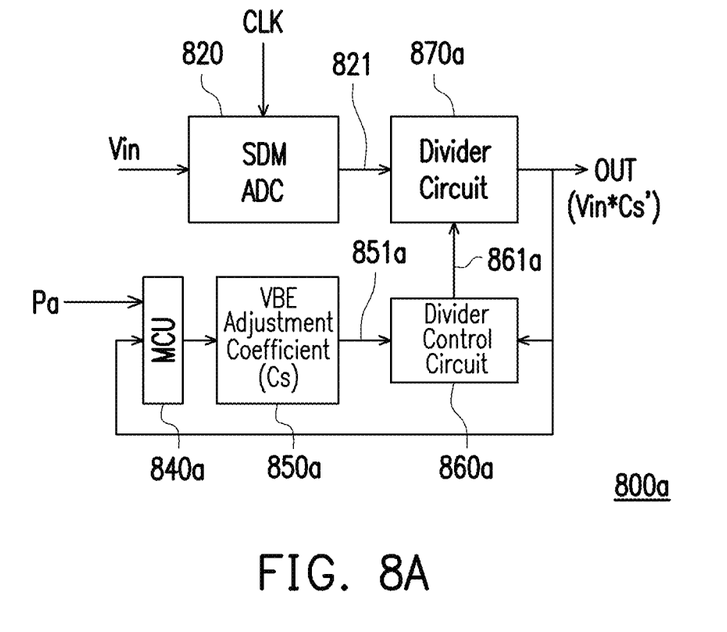
FIGS. 8A through 8B are schematic diagrams of circuits that include coefficient adjustment blocks in accordance with some embodiments.

FIG. 8A illustrates a circuit 800a that includes blocks for coefficient adjustment based on a single-level bit stream in accordance with some embodiments. The circuit 800a receives an input voltage Vin which is a temperature-dependent voltage, and is configured to adjust the thermal coefficient Cs, thereby adjusting (increasing or decreasing) the slope of a differential voltage.

The circuit 800a may include an ADC 820a, a processor 840a for controlling a VBE adjustment coefficient block 850a, a divider control circuit 860a and a divider circuit 870a. The ADC 820a is configured to convert the input voltage Vin to a bit stream 821a. The processor 840a may outputs control bits 841a for controlling the VBE adjustment coefficient block 850a to generate a bit stream 851a based on a thermal coefficient Cs. The bit stream 851a could be a single-level bit stream, and the divider control circuit 860 a is configured to determine the denominator value for the divider circuit according to the bit value of the single-level bit stream 851a. For example, when the single-level bit stream 581a has the logic value of "1", the denominator value is N; and when the single-level bit stream 581a has the logic value of "0", the denominator value is N+1, where N is the BJT ration. The divider circuit 870 a may be a single-level divider circuit that is configured to divide the bit stream 821a by the denominator (e.g., either N or N+1) to obtain the output bit stream OUT. The output bit stream OUT is equivalent to the multiplication of the voltage Vin and the adjustment thermal coefficient Cs' (Vin*Cs'), where the adjustment thermal coefficient Cs' may be determined according to the coefficient Cs and the BJT ration N. In some embodiments, the adjustment thermal coefficient is equal to 1/(N+1−Cs), but the disclosure is not limited thereto.

In some embodiments, the structures of the ADC 820a, the processor 840a for controlling the VBE adjustment coefficient block 850a, the divider control circuit 860a and the divider circuit 870a of the circuit 800a are similar to the structures of the ADC 120, the processor 140 for controlling the VBE adjustment coefficient block 150, the divider control circuit 160 and the divider circuit 170 of the thermal sensor 100 shown in FIG. 1, thus the detailed description about these components are omitted hereafter.

Figure 8B:
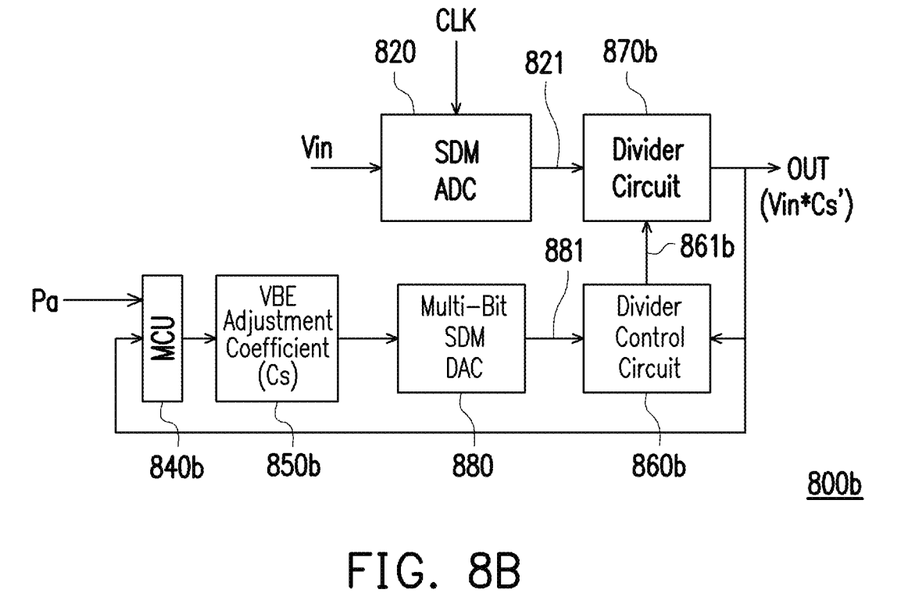

FIG. 8B illustrates a circuit 800b that includes blocks for coefficient adjustment based on a multi-level bit stream in accordance with some embodiments. The circuit 800b may include the ADC 820, a processor 840b for controlling the VBE adjustment coefficient block 850b, a multi-bit digital-to-analog converter (DAC) 880, a divider control circuit 860b and the divider circuit 870b. The processor 840b may control the VBE adjustment coefficient block 850b and the DAC 880 to generate a multi-level bit stream 881. In some embodiments, the DAC 880 may be a second order or a higher order SDM DAC having 1-bit or multi-bit resolution. In addition, a timing algorithm used for the DAC 880 could be based on discrete or continuous timing.

In some embodiments, the divider control circuit 860b receives the multi-level bit stream 881, and is configured to determine the denominator value for the divider circuit 870b according to the bit value of the multi-level bit stream 881. The divider control circuit 860b may determine the denominator value from the set of values that includes N, N+1, N+2, N+3, etc, according to the bit value of the multi-level bit stream 881. For example, if the multi-level bit stream 881 is two-bit stream, the denominator value may be N, N+1, N+2 or N+3 when the bit value of the multi-level bit stream 881 is a first bit value (e.g., "11"), a second bit value (e.g., "10"), a third bit value (e.g., "01"), or a fourth bit value (e.g., "00"), respectively. In some embodiments, N is a pre-determined value that is greater than or equal to 1. In some alternative embodiments, N is determined according to a BJT ratio that is a ratio of a size of a first BJT and a size of a second BJT (e.g., BJT 114 and BJT 118 in FIG. 1).

When the bit stream 821 is divided by the denominator value that is determined according to the multi-level bit stream 881 to generate the output bit stream OUT, the output bit stream OUT will be equivalent to the multiplication of the bit stream 821 and an adjustment thermal coefficient Cs'. The adjustment thermal coefficient is determined according to the percentage of each bit value in the multi-level bit stream 881. In an embodiments, the adjustment thermal coefficient is equal to $1/(N+Cs2+2*Cs3 \ldots)$, in which Cs1 through Cs3 are percentages of bit values in the multi-level bit stream 881. For example, when the multi-level bit stream 881 is two-bit bit stream, Cs1 may be a percentage of the bit value "11" in the multi-level bit stream 881, Cs2 may be the percentage of the bit value "10" in the multi-level bit stream 881, and Cs3 is the percentage of the bit value "01" in the multi-level bit stream 881. The bit stream 821 after being divided by the denominator value that is determined based on the set of values (e.g., N/N+1/N+2/N+3 etc) is equivalent to a multiplication of the bit stream 821 with an adjustment thermal coefficient Cs', in which the value of the adjustment thermal coefficient Cs' is equal to $1/(1+Cs2+2*Cs3)$. For example, if the N=1 and Cs2=0.1, Cs3=0.1, then the Cs' is equal to 0.76923.

Figure 8C:
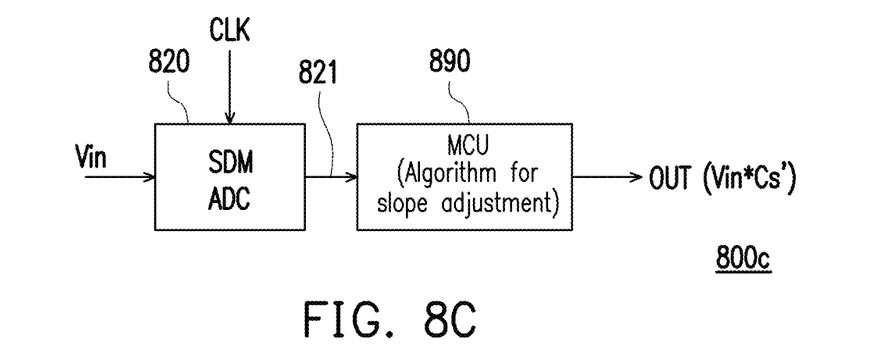
FIG. 8C is a schematic diagram illustrating a circuit that includes coefficient adjustment blocks in accordance with some alternative embodiments.

FIG. 8C illustrates a circuit 800c that includes blocks for coefficient adjustment in accordance with some alternative embodiments. The circuit 800c may include an ADC 820 and a processor 890. The ADC 820 receives an input voltage Vin and is configured to convert the input voltage to a digital bit stream 821, in which the average power of the input voltage may be equal to the average power of the bit stream 821. The processor 890 may execute steps included in an algorithm that has a function of adjusting a coefficient, thereby adjusting the slope of a differential voltage. In some embodiments, the output bit stream OUT is equivalent to a multiplication of the bit stream 821 with the adjustment thermal coefficient. Since the bit stream 821 is equivalent to the input voltage Vin, the output bit stream OUT is equivalent to a multiplication of the input voltage Vin and the adjustment thermal coefficient (Vin*Cs').

Figure 9:
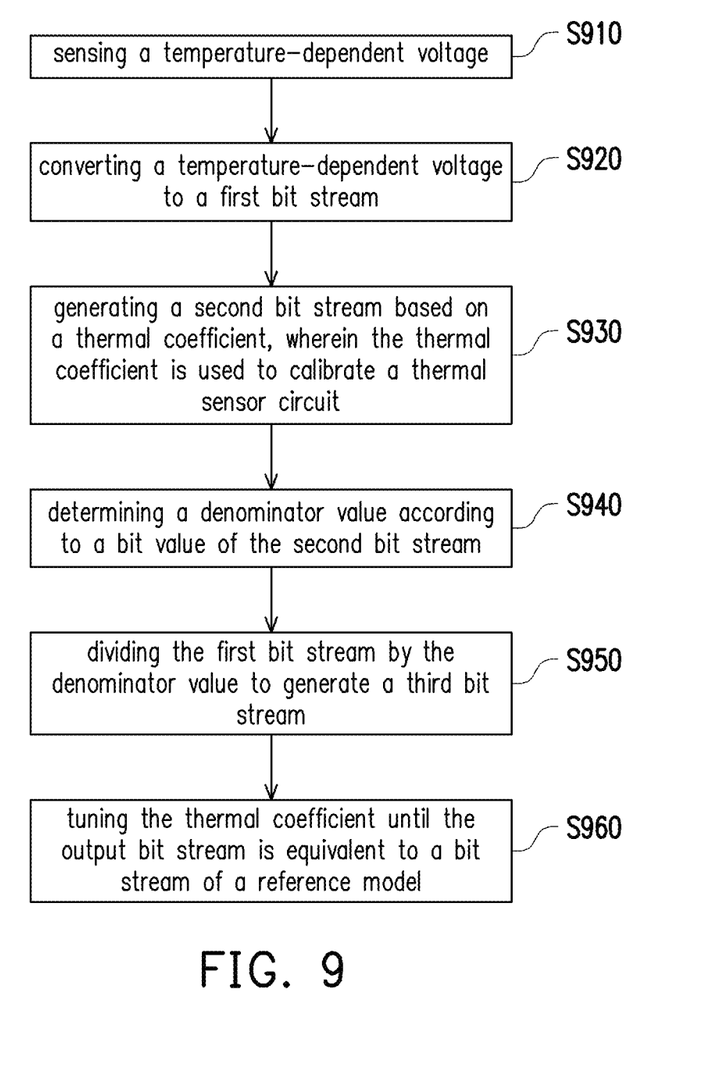
FIG. 9 is a flowchart diagram illustrating steps of an algorithm performed by a processor of a thermal sensor circuit in accordance with some embodiments.

FIG. 9 illustrates steps included in an algorithm that is performed by the circuit 800c shown in FIG. 8C in accordance with some embodiments. In steps S910 and S920, the temperature-dependent voltage is sensed and converted to a first bit stream. In some embodiments, the temperature-dependent voltage is converted to the first bit stream using an ADC (e.g., the ADC 820 in FIG. 8C), in which an average power of the first bit stream is equivalent to an average power of the temperature-dependent voltage. In step S930, the processor 890 generates a second bit stream based on a thermal coefficient Cs. In some embodiments, the duty average one duty cycle in the second bit stream will be equivalent to the value of Cs. In an example, if the thermal coefficient Cs is equal to 0.9, the format of the second bit stream will be nine "1" logic value and one "0" logic value in per 10 cycle bit.

In step S940, the processor 890 may determine a denominator value according to the bit value of the second bit stream. For example, if the second bit stream is a single bit stream, the denominator value is N when the second bit stream has the logic value of "1" and the denominator value is N+1 when the second bit stream has the logic value of "0".

In step S950, the processor 890 is configured to divide a first bit stream which is converted from a temperature-dependent voltage by the denominator value to generate a third bit stream. In some embodiments, the third bit stream will be equivalent to a multiplication of an adjustment thermal coefficient and the first bit stream, wherein the adjustment thermal coefficient is determined according to the thermal coefficient. In step S960, the processor 890 is configured to tune the thermal coefficient until the output bit stream is equivalent to a bit stream of a reference model.

In accordance with some embodiments, a thermal sensor circuit that includes a temperature sensing circuit, an analog to digital converter, a processor, a divider circuit and a digital circuit is introduced. The temperature sensing circuit is configured to generate a first temperature-dependent voltage and a second temperature-dependent voltage. The digital to analog converter is coupled to the temperature sensing circuit and is configured to convert the first temperature-dependent voltage to a first bit stream and to convert the second temperature-dependent voltage to a second bit stream. The processor is configured to generate a third bit stream based on a thermal coefficient, wherein the thermal coefficient is used to calibrate the thermal sensor circuit. The divider circuit is configured to divide one of the first bit stream and the second bit stream by a denominator value to generate a fourth bit stream, wherein the denominator value is determined according to a bit value of the third bit stream. The digital circuit is configured to subtract the other one of the first bit stream and the second bit stream from the fourth bit stream to generate an output bit stream. The processor is further configured to tune the thermal coefficient until the output bit stream is equivalent to a bit stream of a reference model.

In accordance with some embodiments, a thermal sensor circuit that includes a temperature sensing circuit, an analog to digital converter, a digital to analog converter, a processor and a divider circuit is introduced. The temperature sensing circuit is configured to generate a first temperature-dependent voltage and a second temperature-dependent voltage. The digital to analog converter is configured to convert a voltage difference between the first temperature-dependent voltage and the second temperature-dependent voltage to generate a first bit stream. The processor is configured to generate a second bit stream based on a thermal coefficient, wherein the thermal coefficient is used to calibrate the thermal sensor circuit. The divider circuit is configured to divide the first bit stream by a denominator value to generate an output bit stream, wherein the denominator value is determined according to a bit value of the second bit stream. The processor is further configured to tune the thermal coefficient until the output bit stream is equivalent to a bit stream of a reference model.

In accordance with some embodiments, a calibration method for a thermal sensor circuit is introduced. The calibration method includes steps of sensing a temperature-dependent voltage; converting a temperature-dependent voltage to a first bit stream; generating a second bit stream based on a thermal coefficient, wherein the thermal coefficient is used to calibrate the thermal sensor circuit; determining a denominator value according to a bit value of the second bit stream; dividing the first bit stream by the denominator value to generate a third bit stream; and tuning the thermal coefficient until the output bit stream is equivalent to a bit stream of a reference model.

The foregoing has outlined features of several embodiments so that those skilled in art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A thermal sensor circuit, comprising:
   a temperature sensing circuit, configured to generate a first temperature-dependent voltage and a second temperature-dependent voltage;
   an analog to digital converter, coupled to the temperature sensing circuit, configured to convert the first temperature-dependent voltage to a first bit stream and to convert the second temperature-dependent voltage to a second bit stream;
   a processor, configured to generate a third bit stream based on a thermal coefficient, wherein the thermal coefficient is used to calibrate the thermal sensor circuit;
   a divider circuit, configured to divide one of the first bit stream and the second bit stream by a denominator value to generate a fourth bit stream, wherein the denominator value is determined according to a bit value of the third bit stream and the thermal coefficient; and
   a digital circuit, configured to subtract the other one of the first bit stream and the second bit stream from the fourth bit stream to generate an output bit stream, wherein the processor is further configured to tune the thermal coefficient until the output bit stream is equivalent to a bit stream of a reference model.

2. The thermal sensor circuit of claim 1, wherein the temperature sensing circuit comprises:
   a first current mirror, configured to provide a first bias current;
   a first transistor, coupled to the first current mirror, and configured to generate the first temperature-dependent voltage based on the first bias current passing through the first transistor, wherein a gate terminal of the first transistor is electrically coupled to another terminal of the first transistor;
   a second current mirror, configured to provide a second bias current; and
   a second transistor, coupled to the second current mirror, and configured to generate the second temperature-dependent voltage based on the second bias current passing through the second transistor, wherein a gate terminal of the second transistor is electrically coupled to another terminal of the second transistor.

3. The thermal sensor circuit of claim 2, wherein
   a size of the first transistor comprises a width of the first transistor,
   a size of the second transistor comprises a width of the second transistor, and
   the size of the first transistor is different from the size of the second transistor.

4. The thermal sensor circuit of claim 2, wherein
   the first current mirror comprises a first current setting resistor having a first resistance value and is configured to generate the first bias current based on the first resistance value,
   the second current mirror comprises a second current setting resistor having a second resistance value and is configured to generate the second bias current based on the second resistance value, and
   the first resistance value is different from the second resistance value.

5. The thermal sensor circuit of claim 2, wherein
   the third bit stream is a single-level bit stream,
   the denominator value is a first value when the single-level bit stream is a first logic value,
   the denominator value is a second value when the single-level bit stream is a second logic value,
   the first value and the second value are determined according to a transistor ratio that is a ratio of a size of the first transistor and a size of the second transistor, and
   the size of the first transistor comprises a width of the first transistor, and the size of the second transistor comprises a width of the second transistor.

6. The thermal sensor circuit of claim 5, wherein
   the fourth bit stream is equivalent to a multiplication of an adjustment thermal coefficient and the one of the first temperature-dependent voltage and the second temperature-dependent voltage, wherein the adjustment thermal coefficient is determined according to the thermal coefficient.

7. The thermal sensor circuit of claim 4, wherein
   the third bit stream is a multi-level bit stream, and
   the denominator value is selected from a set of values according to the bit value of the multi-level bit stream.

8. The thermal sensor circuit of claim 7, wherein
   the fourth bit stream is equivalent to a multiplication of an adjustment thermal coefficient and the first temperature-dependent voltage,
   the adjustment thermal coefficient is determined according to a percentage of each bit value of the multi-level bit stream, and
   the percentage of a specific bit value is a percentage of the specific bit value among bit values of the multi-level bit stream.

9. The thermal sensor circuit of claim 1, further comprising:
   a divider control circuit, coupled to the divider circuit, configured to receive the third bit stream and determine the denominator value for the divider circuit according to the bit value of the third bit stream.

10. The thermal sensor circuit of claim 1, wherein a value of the thermal coefficient is equivalent to a number of a predetermined bit value of the third bit stream.

\* \* \* \* \*